United States Patent
Chan

(10) Patent No.: US 10,558,643 B2
(45) Date of Patent: Feb. 11, 2020

(54) NOTIFICATIONS SYSTEM FOR CONTENT COLLABORATIONS

(71) Applicant: Dropbox, Inc., San Francisco, CA (US)

(72) Inventor: Richard Chan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 252 days.

(21) Appl. No.: 15/476,380

(22) Filed: Mar. 31, 2017

(65) Prior Publication Data
US 2018/0285405 A1 Oct. 4, 2018

(51) Int. Cl.
*G06F 16/23* (2019.01)
*H04L 29/08* (2006.01)
*G06Q 10/10* (2012.01)
*G06F 16/176* (2019.01)
*G06F 16/17* (2019.01)

(52) U.S. Cl.
CPC ........ *G06F 16/2358* (2019.01); *G06F 16/176* (2019.01); *G06F 16/1734* (2019.01); *G06Q 10/107* (2013.01); *H04L 67/1095* (2013.01); *H04L 67/22* (2013.01)

(58) Field of Classification Search
CPC .............. G06F 16/1734; G06F 16/176; G06F 16/2358; H04L 67/1095; H04L 67/22
See application file for complete search history.

(56) References Cited

U.S. PATENT DOCUMENTS

| 8,359,331 | B2 * | 1/2013 | Petri | G06F 16/168 |
| | | | | 707/780 |
| 9,128,932 | B2 | 9/2015 | Belanger et al. | |
| 9,614,880 | B1 * | 4/2017 | Davis | H04L 65/403 |
| 2003/0046639 | A1 * | 3/2003 | Fai | G06Q 10/10 |
| 2003/0065724 | A1 * | 4/2003 | Clark | G06Q 10/107 |
| | | | | 709/206 |
| 2004/0003352 | A1 * | 1/2004 | Bargeron | G06F 17/24 |
| | | | | 715/230 |
| 2007/0055926 | A1 * | 3/2007 | Christiansen | G06F 17/241 |
| | | | | 715/210 |

(Continued)

OTHER PUBLICATIONS

"Getting Status Information," TortoiseSVN, https://tortoisesvn.net/about.html, 6 pages. (Retrieved from https://tortoisesvn.net/docs/release/TortoiseSVN_en/tsvn-dug-wcstatus.html on Nov. 17, 2017).

(Continued)

*Primary Examiner* — James E Richardson
(74) *Attorney, Agent, or Firm* — Polsinelli PC

(57) ABSTRACT

In some embodiments, a method can involve identifying content items associated with a user account at a content management system that have a follow setting enabled for tracking changes to the content items. The method can involve monitoring, based on the follow setting, content modifications from other user accounts and read-unread status events from the user account. The method can involve identifying, for a content item, an event triggering a different read-unread status than a current read-unread status set on the user account for the content item. The method can further involve modifying the current read-unread status to the different read-unread status and updating the content item to include a visual indication of the different read-unread status.

20 Claims, 15 Drawing Sheets

(56) References Cited

U.S. PATENT DOCUMENTS

| | | | |
|---|---|---|---|
| 2007/0067196 A1* | 3/2007 | Usui | G06Q 10/06 705/7.12 |
| 2007/0157113 A1* | 7/2007 | Bishop | H04L 67/36 715/786 |
| 2007/0180058 A1* | 8/2007 | Wu | G06F 16/957 709/219 |
| 2007/0276809 A1* | 11/2007 | Yoshida | G06F 16/34 |
| 2008/0162651 A1* | 7/2008 | Madnani | G06Q 10/107 709/206 |
| 2013/0318582 A1* | 11/2013 | McCann | G06F 21/41 726/7 |
| 2014/0359465 A1* | 12/2014 | Litan Sever | G06F 3/04817 715/738 |
| 2014/0379586 A1 | 12/2014 | Sawyer | |
| 2015/0381724 A1* | 12/2015 | Simmons | H04W 8/18 709/205 |
| 2016/0286002 A1* | 9/2016 | Marra | H04L 51/32 |
| 2018/0040303 A1* | 2/2018 | Lin | G09G 5/377 |

OTHER PUBLICATIONS

"NotifyBox Manual," NotifyBox, http://notifybox.com/Home.aspx, 10 pages. (Retrieved from http://www.notifybox.com/NotifyboxSetup/CurrentVersion/NotifyboxManual.pdf on Nov. 17, 2017).

"10 Tools to Monitor Files and Folders for Changes in Real Time" Raymond.CC Blog, Raymondcc Tech, Houston, TX, 15 pages. (Retrieved from https://www.raymond.cc/blog/3-portable-tools-monitor-files-folders-changes/view-all/ on Nov. 17, 2017).

* cited by examiner

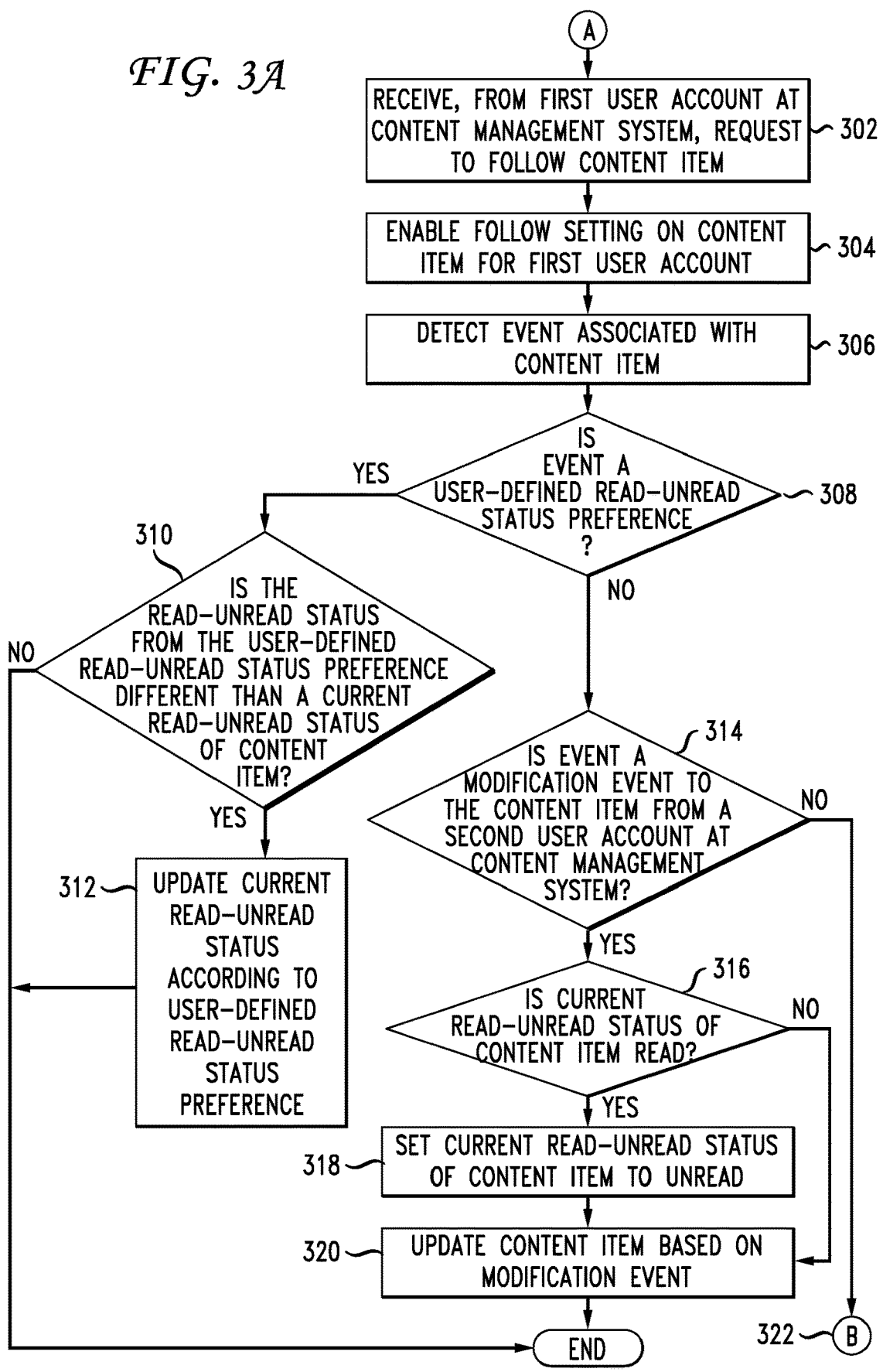

NOTIFICATIONS SYSTEM FOR CONTENT COLLABORATIONS

TECHNICAL FIELD

The present technology pertains to content tracking and collaboration systems.

BACKGROUND

The evolution and ubiquity of software and computer tools has created a digital revolution that continues to reshape business and society. Digital technologies have transformed how users work, interact, and conduct business. For example, users often rely on electronic mail and messaging systems to communicate, productivity applications to create and modify documents, calendar applications to manage schedules and events, and network systems to share and access data. Increasingly, innovations in software and computer technologies have had a profound impact on user efficiency and collaboration.

Unfortunately, the digital technologies have also created new challenges. For example, while furthering collaboration and facilitating communication exchanges, digital technologies have also spurred an increase in the volume and frequency of data and communication exchanges between users. The higher volume of information and exchanges obscure important information and make it very difficult for users to track specific items and collaborations of interest.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings in which:

FIGS. 3A and 3B illustrate flowcharts for following content items and tracking read-unread status information in a synchronized collaboration environment;

DETAILED DESCRIPTION

Figure 1:
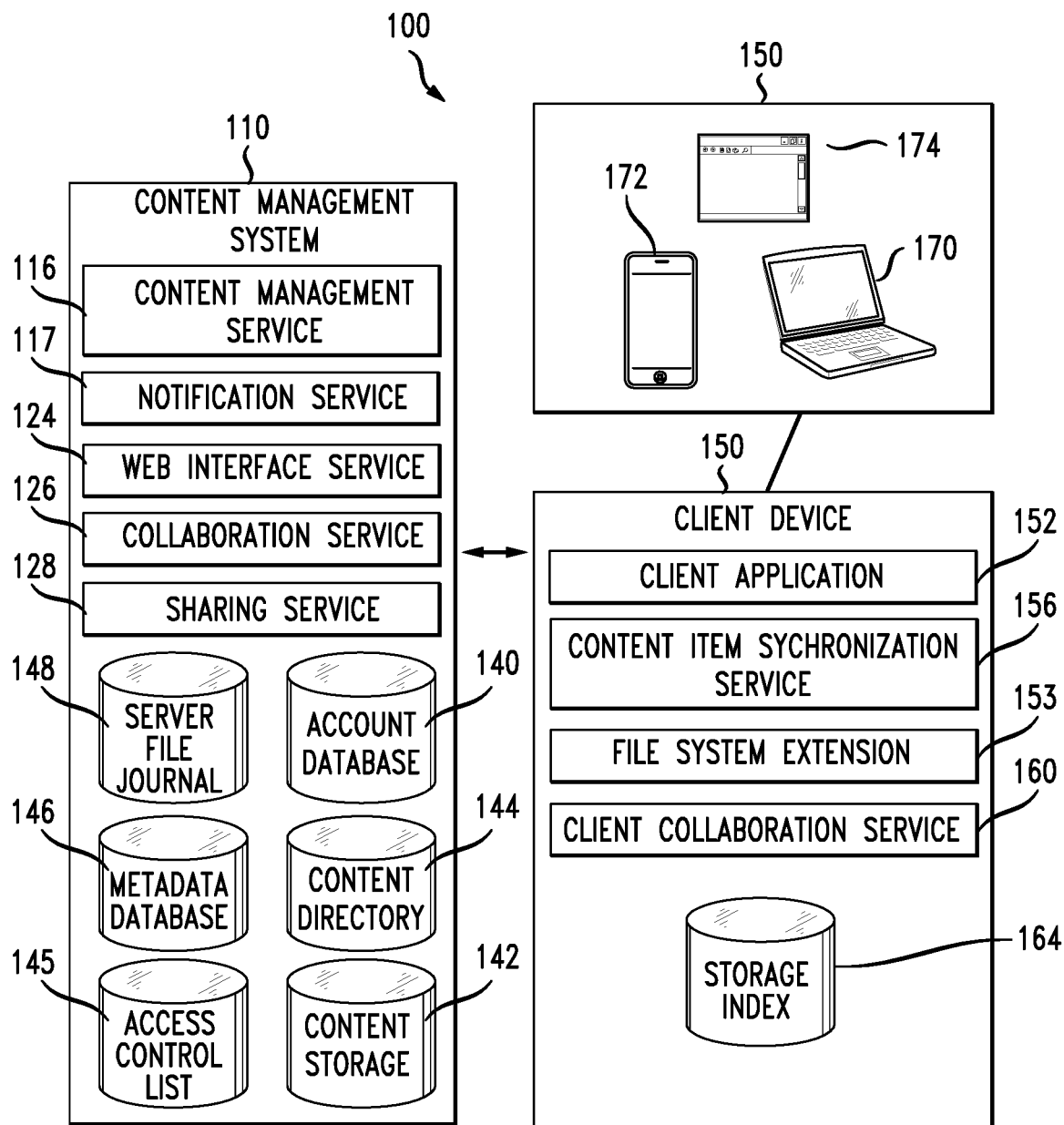
FIG. 1 illustrates an example system configuration of a content management system and client devices.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Managing and tracking data in large content and collaboration systems can be a daunting task. As previously explained, high volumes of information and collaboration exchanges can obscure important information and make it very difficult for users to track items and collaborations of interest. The disclosed technology addresses the need in the art for intelligent collaboration systems capable of efficiently managing high volumes of data and tracking a wide range of collaboration events, including local and online events at different devices. The approaches set forth herein can efficiently track content items and collaboration events and intelligently tailor the presentation of content to users to increase the visibility and access to content and events of interest to the user. The content management architectures and configurations described herein can significantly improve content presentation and collaboration technologies in a highly integrated digital environment.

For example, a content management system and architecture, as further described below, can allow users to collaborate and share content from different devices, user accounts, and networks, and maintain collaborations and shared content synchronized across the different devices, user accounts, and networks. Users can select to follow specific content items that are of interest to the users, to increase the visibility and access to the specific content items as well as any collaboration events or updates to those content items. When a user selects to follow a particular content item, that content item (as well as any sub-items) can be tracked for any changes in status, content, or interactions, and the user can be efficiently informed of such changes and given prioritized presentations or access to the content item with the changes. User read and unread events and preferences can be monitored for a particular content item being followed, and compared with events associated with that particular content item from other users, to determine how to present that particular content item and any associated events to the user. Content items followed can be presented to the user with visual indication(s) reflecting the read or unread status of the content items followed, as calculated based on the preferences and tracked events across one or more user accounts.

In some cases, followed content items can be grouped together and/or presented in a particular followed items interface, section, or window to allow users quick access to followed content items as well as additional focus or emphasis vis-à-vis other content items, for example. Followed content items can also be presented according to a corresponding hierarchy or file structure, which can be based on the underlying hierarchy or file structure implemented in a particular context. For example, a folder containing files and sub-folders according to a specific hierarchy or file structure can be presented according to the specific hierarchy or file structure, which can allow a user to obtain a presentation of the folder and any sub-items in a user-friendly manner that preserves the hierarchies and navigation relationships familiar to the user while providing additional status information and/or presentation focus for the user.

Figure 2A:
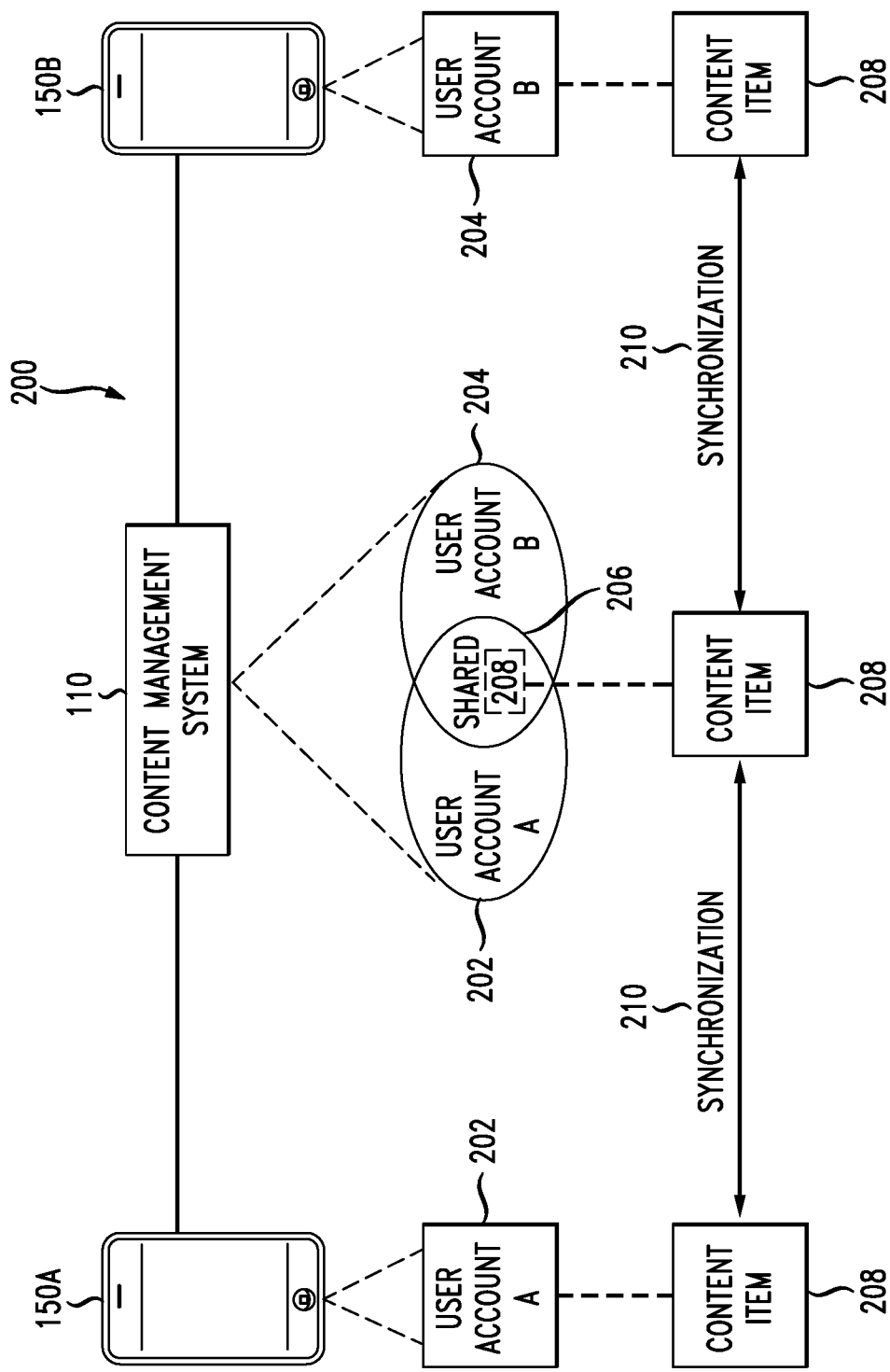
FIGS. 2A, 2B, and 2C illustrate an example synchronized collaboration environment and example interactions for synchronizing content items, sharing content items, and following content items in the synchronized collaboration environment.

Further description, examples, and variations are provided below in the disclosure as follows. The disclosure begins with a discussion of example architectures and environments for collaboration and content sharing, as shown in FIGS. 1, 2A, and 2C. A more detailed description of technologies for following collaboration and shared content events, as shown in FIGS. 3A, 3B, 4A through 4F, 5A, and 5B, including various examples and configurations, will then follow. The disclosure concludes with a description of a example computing device for following collaborations and shared content events, as shown in FIG. 6. The disclosure now turns to FIG. 1.

In some embodiments the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 145. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110.

Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

Content management system 110 can provide information about how users are interacting or have interacted with a content item, such as a shared content item. Content management system 110 can report that a user whom which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item. Content management system 110 and/or client device 150 can track user interactions with content, such as read or write events, and maintain a history of such events and interactions for a user.

Content management system 110 can report a history of user interactions with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface.

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 160 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

FIG. 2A illustrates an example synchronized collaboration environment 200, which depicts content management system 110 interacting with client devices 150A-B to synchronize content items. In this example, content management system 110 can store content items 202 for user account A and content items 204 for user account B. Content management system 110 can also store shared content items 206. Shared content items 206 can include content items that are shared between user account A and user account B, or otherwise accessible by both user account A and user account B. For example, shared content items 206 can include content item 208 available to user account A and user account B.

Client device 150A can access content items 202 from content management system 110 and/or client device 150A via user account A. Client device 150B can access content items 204 from content management system 110 and/or client device 150B via user account B. Client devices 150A-B can access content item 208 from user account A and user account B. Client devices 150A-B can access content item 208 from content management system 110 and/or locally from client devices 150A-B. For example, client devices 150A-B can store a local copy of content item 208 and thus may access content item 208 remotely from content management system 110 or locally from client devices 150A-B.

Content item 208 can be synchronized 210 between content management system 110 and client devices 150A-B for user account A and user account B. Content management system 110 can maintain copies of content item 208 stored at client devices 150A-B and content management system 110 synchronized and up-to-date across devices. Thus, if content item 208 is modified from a particular device, the now modified version of content item 208 can be synchronized with other copies of content item 208 at other devices or locations. For example, if a copy of content item 208 stored at client device 150B is modified via user account B, the updated version of content item 208 can then be synchronized with content item 208 at content management system 110 and client device 150A. Content management system 110 can manage synchronization 210 of content item 208 between devices and user accounts to ensure uniformity and/or avoid conflicts between content item versions.

Content management system 110 can synchronize content item 208 with other client devices accessed via user account A, user account B, or any other user account that content item 208 is shared with. Content management system 110 can also synchronize other content items shared between user accounts and/or devices. For the sake of simplicity and explanation purposes, synchronization 210 is illustrated in FIG. 2A with respect to client devices 150A-B, user accounts A and B, and content item 208. However, it should be understood that this is a non-limiting example and synchronization 210 can involve additional client devices, user accounts, content items, etc.

As the number of content items shared and user accounts having shared access increase in a synchronization environment, collaboration events between devices and user accounts can also increase. An increase in collaboration events can also increase the number of synchronization events for one or more user accounts. A higher volume of collaboration and synchronization events can make it very difficult for a user to track a specific content item and associated updates. In larger scale examples, a content item can be buried within a high volume of other content items available to a user. The user may not be able to detect which items have been updated by other users, and may even miss important updates.

Accordingly, the approaches herein allow users to follow specific content items, to help the users keep track of limited content items of interest and better monitor updates to those content items, such as modifications from other users or devices. Followed content items can be accessibly displayed to the user with visual indications of the read or unread status of those content items, which allows the user to quickly identify when a content item of interest has been modified since the user accessed that content item.

Figure 2B:
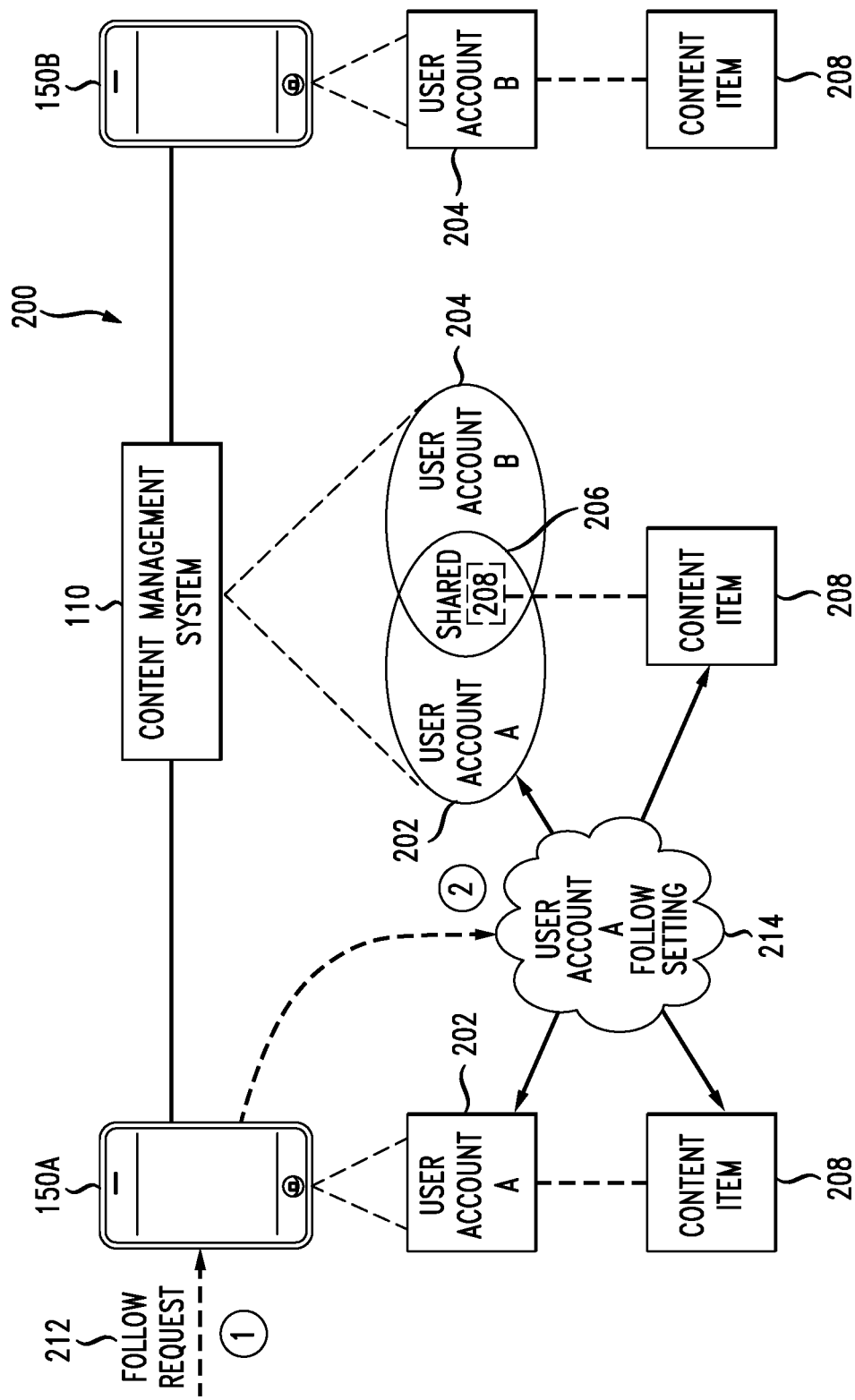
Figure 2C:
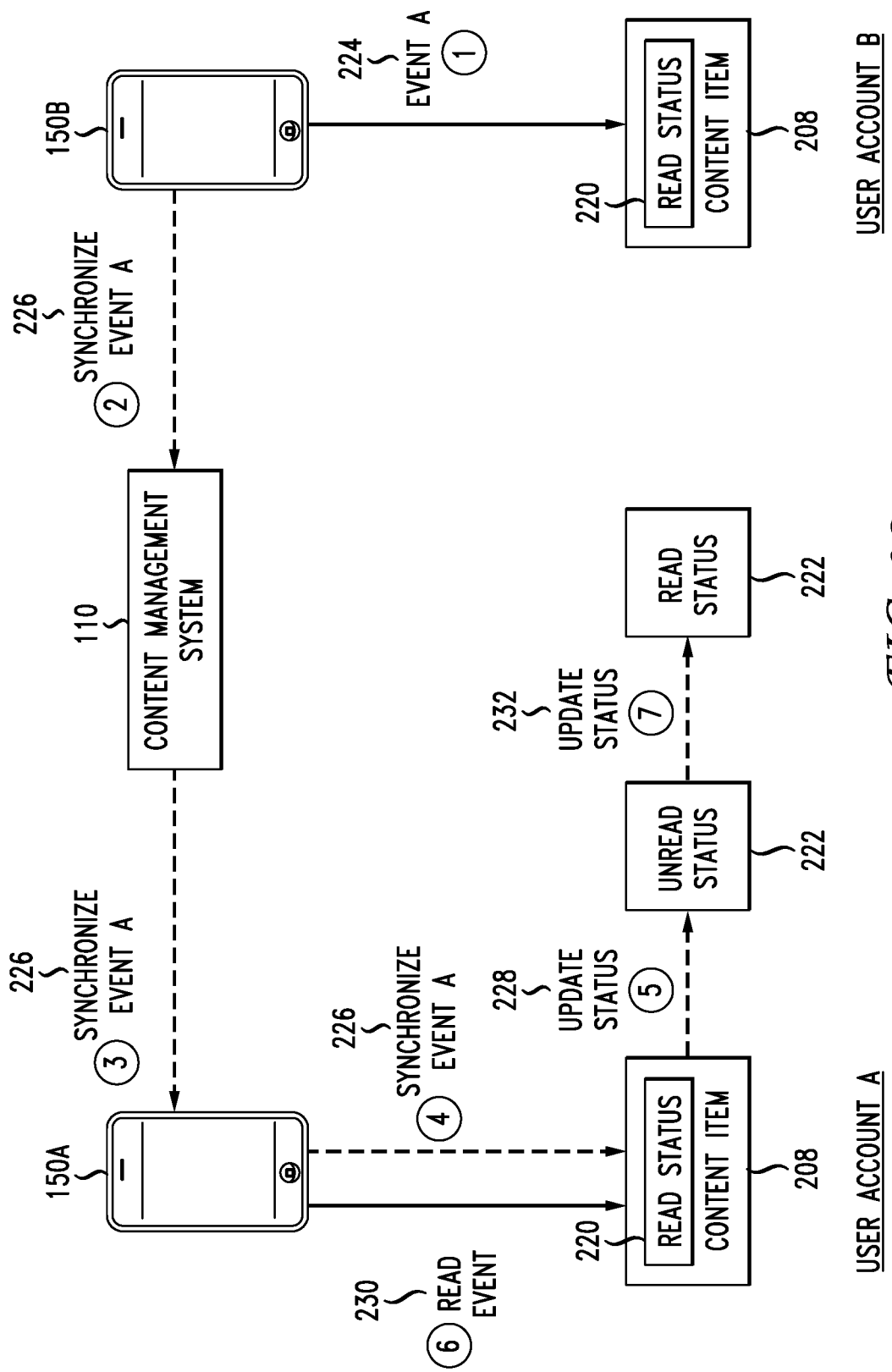

Referring to FIG. 2B, the user at client device 150A can initiate follow request 212 to follow content item 208 from user account A. Client device 150A can then enable follow setting 214 for content item 208 and user account A. User account A settings or preferences can be updated according to follow setting 214 to enable user account A to follow (e.g., watch content item 208, changes to content item 208, status updates for content item 208, etc.) content item 208 from client device 150A and/or any other device. Follow setting 214 can instruct client device 150A and/or content management system 110 to track and display updates and status information related to content item 208 for user account A.

The status information can include a read-unread status of content item 208 for user account A, which can be updated based on events in collaboration environment 200 associated with content item 208, such as content modifications and read-unread events. The read-unread status of content item 208 for user account A can be monitored and/or updated as events relating to content item 208 are generated. Content item 208 can be presented to user account A with one or more visual indications of the read-unread status of content item 208. The visual indications and/or presentation of content item 208 can be updated as the read-unread status of content item 208 changes for user account A.

FIG. 2C illustrates read-unread status updates and events in collaboration environment 200. In this example, user account A and user account B have follow setting 214 enabled for content item 208, and content item 208 is initially shown with read status 220 for user account A and user account B. Read status 220 indicates that the respective user has seen or accessed the current version of content item 208, or otherwise set a preference for content item 208 to reflect read status 220.

Client device 150B first generates an event 224 that modifies content item 208 at client device 150B. This triggers synchronization 226 of event 224 with content management system 110 and client device 150A. Synchronization 226 of event 224 results in content item 208 being modified for user account A according to event 224. In addition, synchronization 226 of event 224 triggers update status 228 for content item 208 at user account A. Update status 228 changes read status 220 on user account A for content item 208 to unread status 222. Unread status 222 indicates that content item 208 has been modified. Moreover, unread status 222 indicates that user account A has not seen or accessed the current version of content item 208, or otherwise set a preference for content item 208 to reflect unread status 222. Content item 208 can be depicted to indicate unread status 222 is set, to alert user account A that content item 208 has been modified.

Unread status 222 can remain set for content item 208 at user account A until read event 230 is generated by user account A. Read event 230 can be any operation by user account A that opens, reads, edits or modifies content item 208, or otherwise resets a read preference for content item 208 to reflect read status 220. If content item 208 is set to unread status 222, read event 230 will trigger update status 232 for content item 208 at user account A. Update status 232 changes unread status 222 back to read status 220. Content item 208 can be updated for user account A to indicate it has read status 220.

The read-unread status of content item 208 be further updated as read-unread status triggering events are detected for user account A. A read-unread status triggering event can be an event that triggers a read or unread status for content item 208. The read-unread triggering event can include a read triggering event or an unread triggering event. A read triggering event is an event that triggers a read status and an unread triggering event is an event that triggers an unread status. Whether an event is a read triggering event or an unread triggering event can depend on the type or characteristics of the event, but may also depend on other factors, such as the current read-unread status of content item 208; the current read-unread status of other content item(s) that inherit from content item 208, or propagate to content item 208, a read-unread status; the user account that originated the event; etc. Thus, an event may trigger a read or unread status in some circumstances, but may not trigger a read or unread status in other circumstances, as will be further described below.

A read status triggering event can be a read event from the user account associated with follow setting 214 (i.e., user account A) that triggers a change in the read-unread status of content item 208 from unread (i.e., unread status 222) to read (i.e., read status 220). The read event is tied to the user account associated with follow setting 214 because the read status of content item 208 is specific to that user account, which in this example is user account A. Non-limiting examples of read status triggering events for user account A can include opening content item 208, editing or modifying content item 208, manually setting the read-unread status of content item 208 to read (i.e., read status 220), an unread status setting exceeding an unread expiration threshold or time interval associated with content item 208, modifying metadata or preferences associated with content item 208, as well as other user and content interactions.

As previously noted, a read event is a read status triggering event for content item 208 if it triggers the read-unread status of content item 208 from unread to read. A read event can trigger the read-unread status of content item 208 to read if the read-unread status of content item 208 is set to unread at the time or before the read event. Thus, if content item 208 has unread status 222, a read event can become a read status triggering event and trigger the read-unread status of content item 208 to read status 220. On the other hand, if the read-unread status of content item 208 is already set to read, a read event may not become a read status triggering event because it will not trigger a change in the read-unread status of content item 208.

An unread status triggering event can be an unread event from a user account or client device that is not associated with follow setting 214 (e.g., a user account other than user account A or a device other than client device 150A, such as client device 150B, content management system 110, user account B, etc.), that triggers a read-unread status to change from read to unread. Non-limiting examples of unread status triggering events can include an update to content item 208; an update to a content item within content item 208; a modification to content, metadata, or settings associated with content item 208; a collaboration or sharing event associated with content item 208 (e.g., sharing content item 208 with other users, modifying user account membership or permission settings, adding or removing messages or notes, downloading content to a client device, etc.); a content item move, link, or rename operation associated with content item 208; or any other interaction between content item 208 and other user accounts or devices.

Unread status triggering events are typically generated by other user accounts or devices that are not associated with follow setting 214 (e.g., any account other than user account A, such as user account B). However, in some cases, an unread status triggering event can be generated from the user account and/or client device associated with follow setting 214 (i.e., user account A or client device 150A). For example, an unread status triggering event can be a user input from user account A that manually sets the read-unread status for content item 208 to unread (i.e., unread status 222).

As another example, user account A can generate an unread status triggering event in other ways, such as disabling and re-enabling follow setting 214, which could reset or restart the read-unread status of content item 208; initiating or triggering a synchronization (e.g., synchronization 226) of content item 208 from content management system 110; moving content item 208 to a location having follow setting 214 enabled and a read-unread status set to unread, such as moving content item 208 inside a folder that has an unread status (i.e., unread status 222); deleting content item 208 from a device associated with the first user account, such as client device 150A; downloading or synchronizing the first user account and/or associated content items with content management system 110; installing or re-installing a software application at a client device associated with the first user account (e.g., client device 150A) for accessing or managing content items associated with the first user account, such as uninstalling and reinstalling client application 152 on client device 150A and thereby triggering copies of content items associated with the first user account to be downloaded from content management system 110 to client device 150A; etc.

While read or unread events are described above with respect to content item 208, read or unread events do not have to be specific to content item 208 to become read status triggering events or unread status triggering events. For example, the read-unread status of one or more content items can be inherited or propagated between those content items from other content items based on respective relationships or hierarchies. To illustrate, content item 208 may be involved in a read event and nevertheless maintain its read-unread status set to unread because content item 208 may inherit unread status 222 from a content item within content item 208, such as a sub-item. Similarly, if content item 208 is within another content item, such as a folder, content item 208 can inherit from the other content item, or propagate to the other content item, its read-unread status. Thus, a change in the read-unread status of a specific content item can trigger a change in the read-unread status of that content item as well as other content items.

For example, if content item 208 is a folder, it can inherit the read-unread status of one or more of its sub-items. Thus, if a sub-item has its read-unread status set to unread, content item 208 may inherit its read-unread status from the sub-item and maintain the read-unread status as unread until content item 208 stops inheriting the read-unread status of the sub-item or the read-unread status of the sub-item changes to read. In some cases, content item 208 can inherit unread status 222 if any sub-items within content item 208 are set to unread. Accordingly, if a read event is detected for content item 208 while a sub-item remains with unread status 222, the read event may not trigger the read-unread status of content item 208 to change from unread to read unless the read event also causes the read-unread status of the sub-item to change to read.

As another example, if content item 208 is a sub-item within another content item, such as a folder, content item 208 can inherit from the other content item, or propagate to the other content item, the read-unread status of content item 208. To illustrate, if content item 208 is a sub-item within Folder A, content item 208 may inherit read status 220 from Folder A or propagate unread status 222 to Folder A. Moreover, in some examples, user-defined read-unread status preferences may override other read-unread status rules or conditions. For example, if user account A manually sets the read-unread status of content item 208 to read status 220, content item 208 can change its read-unread status to read status 220 even if a sub-item has unread status 222 and content item 208 is configured to inherit unread status 222 from any sub-items. In this example, content item 208 may even propagate read status 220 to any sub-items having a respective unread status.

FIG. 3A illustrates a flowchart of an example process for following content items and tracking read-unread status information in a synchronized content management environment. At step 302, client device 150A can receive, from a first user account (e.g., user account A) at content management system 110, a request to follow content item 208. At step 304, client device 150A and/or content management system 110 can enable follow setting 214 on content item 208 for the first user account. As previously explained, follow setting 214 can trigger read-unread status information pertaining to content item 208 to be tracked and depicted for the first user account. This can involve monitoring events and read-unread status information relating to content item 208 and other content items, to determine if the read-unread status of content item 208 should be changed or updated after a specific event.

At step 306, client device 150A and/or content management system 110 can detect an event associated with content item 208. At step 308, client device 150A and/or content management system 110 can determine if the event is a user-defined read-unread status preference. A user-defined read-unread status preference can be a read preference or an unread preference, and may trump other read-unread status settings which are not manually or specifically defined by the user. If the event is a user-defined read-unread status preference, at step 310, client device 150A and/or content management system 110 can determine if the user-defined read-unread status preference is different than a current read-unread status of content item 208. As previously noted, user-defined read-unread status preferences can be given more weight or priority than other status settings. Accordingly, if the user-defined read-unread status preference is different than the current read-unread status of content item 208, at step 312, client device 150A and/or content management system 110 can update the current read-unread status of content item 208 according to the user-defined read-unread status preference.

For example, if the user-defined read-unread status preference is a read preference and the current read-unread status of content item 208 is an unread status (i.e., unread status 222), then the current read-unread status of content item 208 can be changed to the read preference from the user-defined read-unread status preference. On the other hand, if the user-defined read-unread status preference is an unread preference and the current read-unread status of content item 208 is a read status (i.e., read status 220), then the current read-unread status of content item 208 can be changed to the unread preference from the user-defined read-unread status preference.

If the read-unread status event is not a user-defined read-unread status preference, client device 150A and/or content management system 110 can determine if the event is another type of read or unread status event. At step 314, client device 150A and/or content management system 110 can determine if the event is a modification to content item 208 from a second user account (e.g., user account B) at content management system 110. A modification to content item 208 from a second user account can be an unread event and may trigger a read-unread status of content item 208. Thus, client device 150A and/or content management system 110 can determine at step 314 if the event is an unread status event.

Figure 3B:
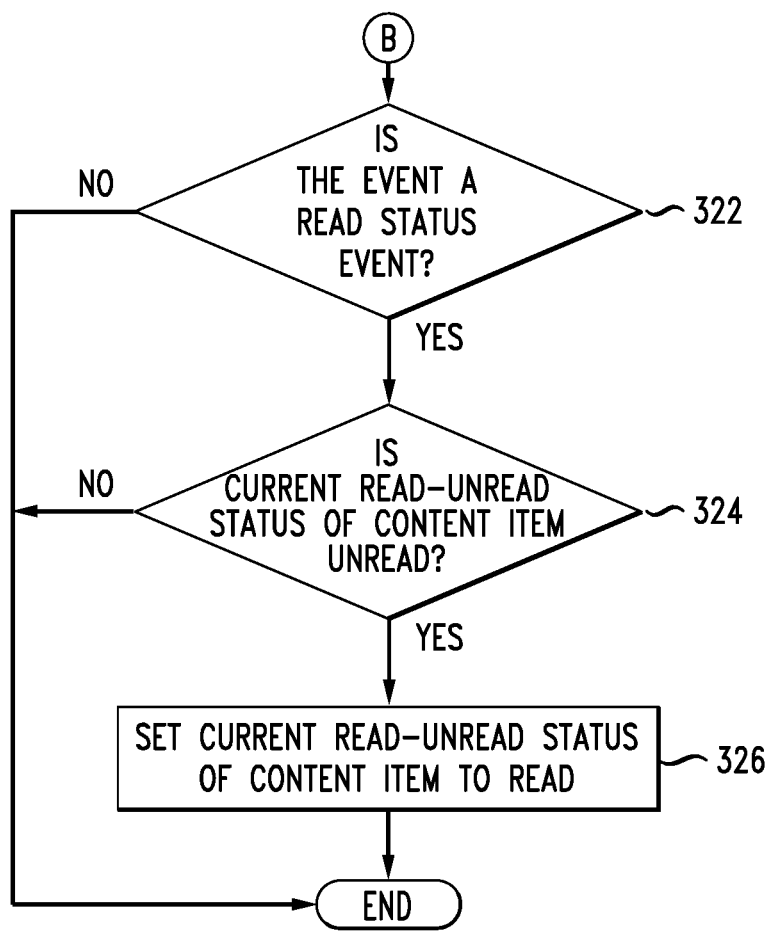

If the event is not a modification to content item 208 from a second user account at content management system 110, the process can continue to step 322, as shown in FIG. 3B and described below, to determine if the event is a read status triggering event. If the event is a modification to content item 208 from a second user account at content management system 110, at step 316 client device 150A and/or content management system 110 can determine if the current read-unread status of content item 208 is set to read.

If the current read-unread status of content item 208 is not set to read (i.e., the current read-unread status is set to unread), at step 320, client device 150A and/or content management system 110 can update content item 208 based on the modification to content item 208 without changing the read-unread status of content item 208. Here, the read-unread status event is not an unread status triggering event because content item 208 already has its read-unread status set to unread and does not require a status update. Accordingly, the content of content item 208 can be updated based on the modification to synchronize content item 208, but the read-unread status does not change and remains set to unread.

If the current read-unread status of content item 208 is set to read, at steps 318 and 320, client device 150A and/or content management system 110 can set the current read-unread status of content item 208 to unread and update content item 208 based on the modification to content item 208.

Referring to FIG. 3B, at step 322, if the event is a read status event, client device 150A and/or content management system 110 can determine at step 324 if the current read-unread status of content item 208 is set to unread. If the current read-unread status of content item 208 is set to unread, at step 326, client device 150A and/or content management system 110 can set the current read-unread status of content item 208 to read based on the event being a read status event. In this example, the event is a read status triggering event because it triggered a change from unread status 222 to read status 220.

On the other hand, if the current read-unread status of content item 208 is not set to unread (i.e., the current read-unread status is read), then the read status event is not a read status triggering event and the current read-unread status of content item 208 is not changed.

Figure 4A:
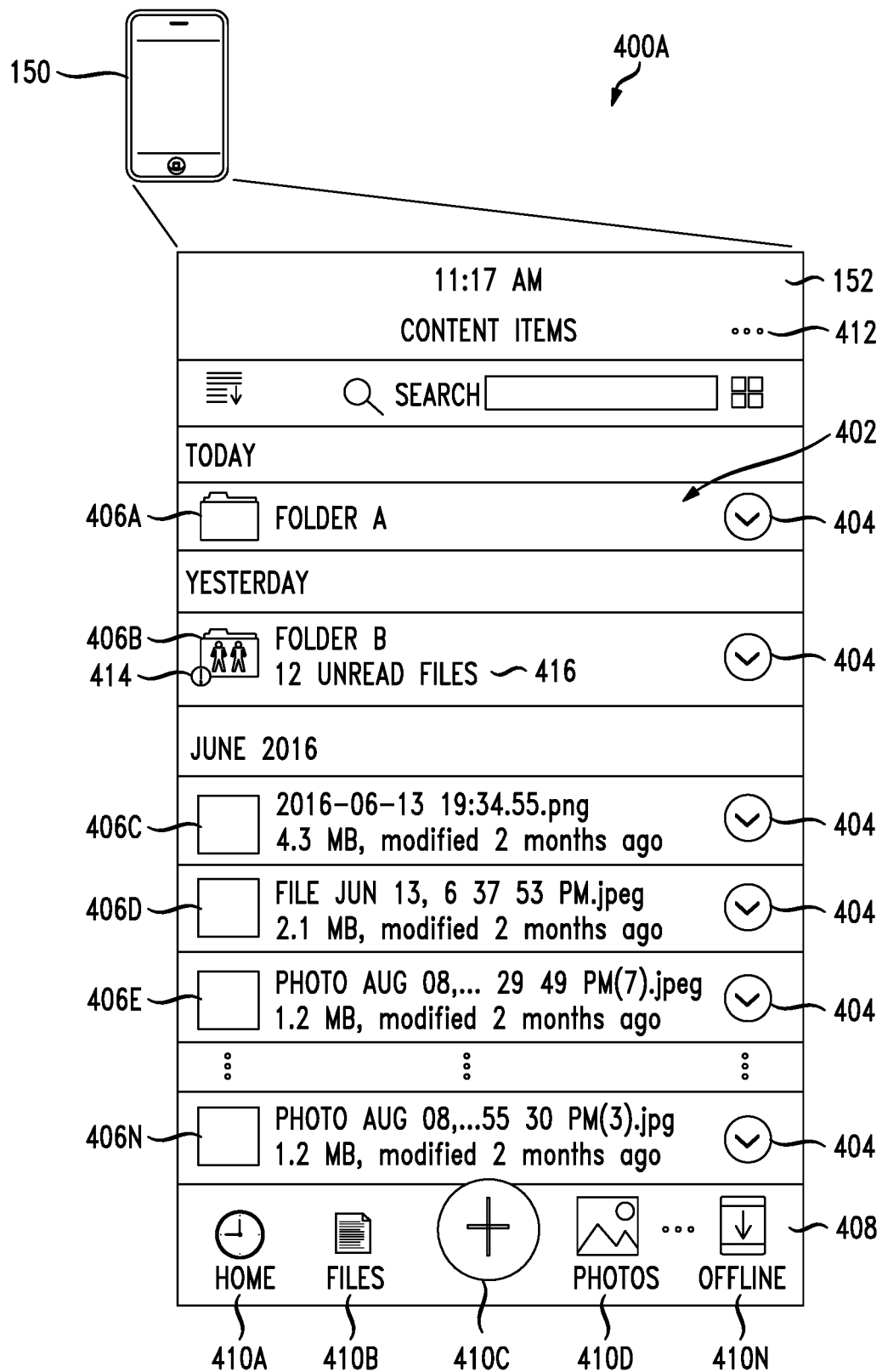
FIGS. 4A, 4B, 4C, 4D, 4E, and 4F illustrate example graphical interface views for following content items in a synchronized collaboration environment.

The disclosure now turns to FIGS. 4A-F which illustrate example graphical interface views for following content items in a synchronized environment. Referring to FIG. 4A, view 400A illustrates a graphical interface view from client application 152 at client device 150. View 400A can present content window 402 for presenting content items 406A-N (collectively "406" hereinafter) associated with a user account (e.g., user account A) at content management system 110. Content items 406 can be presented with selectable options 404 for modifying respective preferences, including follow settings as further described below.

Content items 406 can be presented with metadata 416, which can provide information about the associated content items 406, such as a modification date, a number of sub-items contained within the content item, a read or unread status of the content item, a number of sub-items with a read and/or unread status, a content size, an author, etc. One or more content items 406 can also depict read-unread status indicator 414. Read-unread status indicator can provide a visual indication that an associated content item has an unread status or a read status. In some cases, read-unread status indicator 414 can provide a visual indication that an associated content item has an unread status. In this example, a content item with a read status may not depict read-unread status indicator 414. A content item that does not depict read-unread status indicator 414 can be assumed to have a read status.

In other examples, every content item 406 may depict read-unread status indicator 414 according to a current read-unread status of the content item. Thus, each content item will include a visual indication that the content item has a read status or an unread status.

In some cases, read-unread status indicator 414 can be selectable. User selection of read-unread status indicator 414 may trigger a presentation of additional status information, such as read or unread statistics, additional information about the current read-unread status (e.g., an indication of the last status event or change, a date or time of the last status event or change, an indication of the user associated with the last status event or change, etc.). In other examples, user selection of read-unread status indicator 414 may trigger client application 152 to open the content item associated with read-unread status indicator 414, toggle a read-unread status of the content item, present one or more modifications made to the content item which resulted in an unread status, etc.

Content window 402 can also include toolbar 408, which can present selectable elements 410A-N (collectively "410" hereinafter). Selectable elements 410 can provide controls for navigating content and/or interacting with client application 152. For example, toolbar 408 can include home element 410A for navigating to a home page, files element 410B for accessing files, upload element 401C for uploading content items, photos element 410D for accessing photos, offline element 410N for browsing content and/or interacting in an offline mode which provides content at client device 150 without having to access content management system 110 during the offline period.

Content window 402 can also present control options 412 for other settings and/or functionalities, such as authentication, switching accounts, navigating to other locations, editing preferences, etc.

Figure 4B:
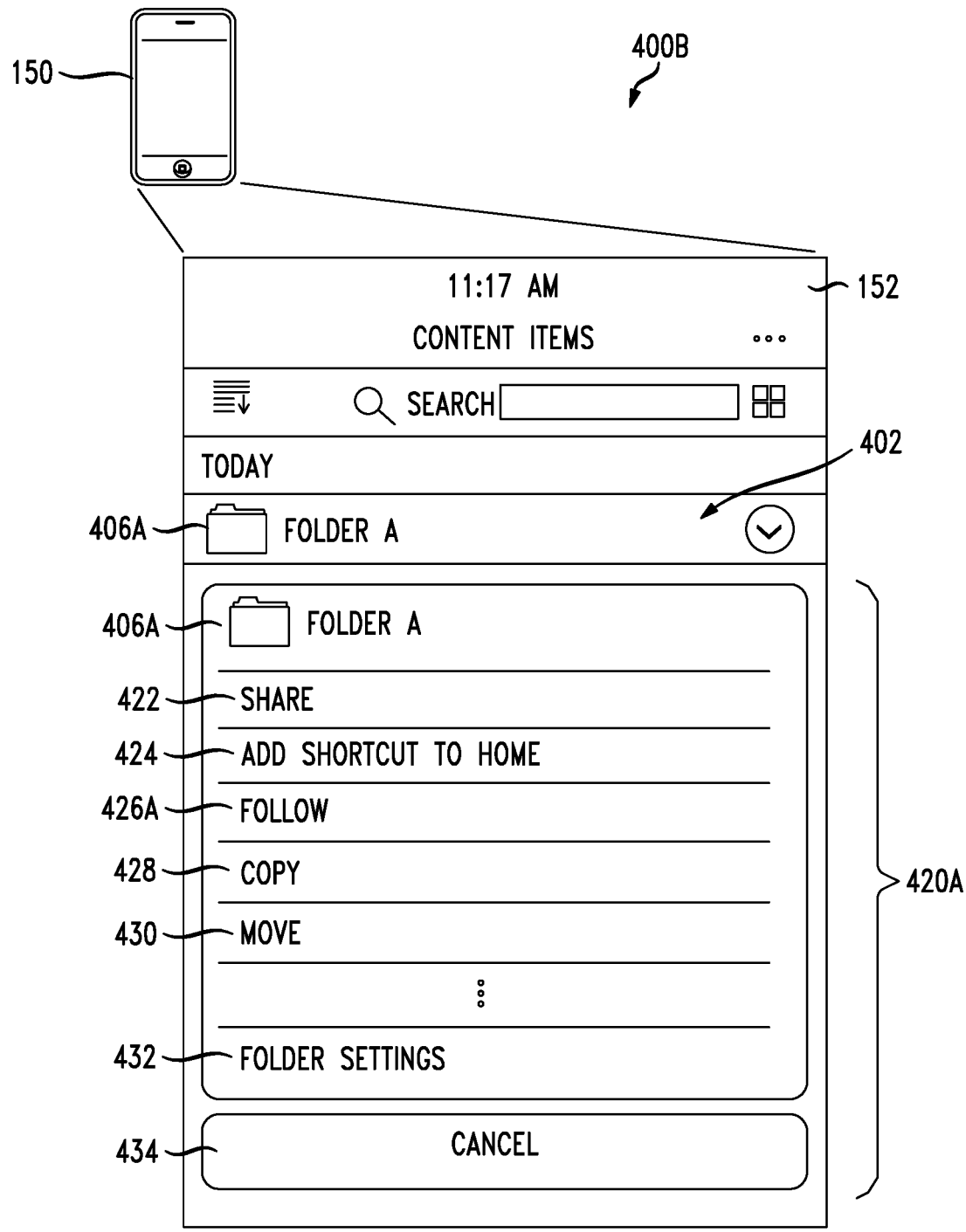

FIG. 4B illustrates view 400B displaying preferences window 420A for content item 406A. Preferences window 420A for content item 406A can be triggered by selecting selectable option 404 of content item 406A in view 400A. Preferences window 420A can allow a user to set preferences 422, 424, 426A, 428, 430, 432 for content item 406A.

For example, preferences window 420A can include share preference 422 which allows the user to share content item 406A with other users and/or devices. Share preference 422 can allow the user to obtain a sharing link that the user can send to other users for accessing content item 406A and/or provide information about one or more user accounts or client devices that should receive a link and/or membership to content item 406A.

Preference 424 can allow the user to add a shortcut to content item 406A to a home page or portal for that user. This can allow the user to access content item 406A from the home page or portal without having to navigate through various levels of content, for example.

Follow setting 426A can allow the user to enable following of content item 406A. Thus, if the user selects follow setting 426A, content item 406A will be configured for the user's account according to follow setting 426A, as previously explained with respect to follow setting 214 in FIGS. 2A-C as well as FIGS. 3A-B.

Follow setting 426A will enable tracking of events and status information associated with content item 406A, and will influence how content item 406A is presented to the user, as further described below.

Preferences 428, 430 can allow the user to select specific operations for content item 406A, such as a move operation, a copy operation, a renaming operation, a delete operation, etc. Preference 432 can support additional content item preferences, such as security preferences, membership or sharing preferences, display preferences, status preferences (e.g., whether to inherit preferences from other items, whether to propagate preferences to other items, whether to prioritize certain types of events, which types of events should be recognized as read or unread events, etc.).

Preference 434 can provide additional control preferences for preferences window 420A, such as a cancel, close, save, submit, undo, etc.

Figure 4C:
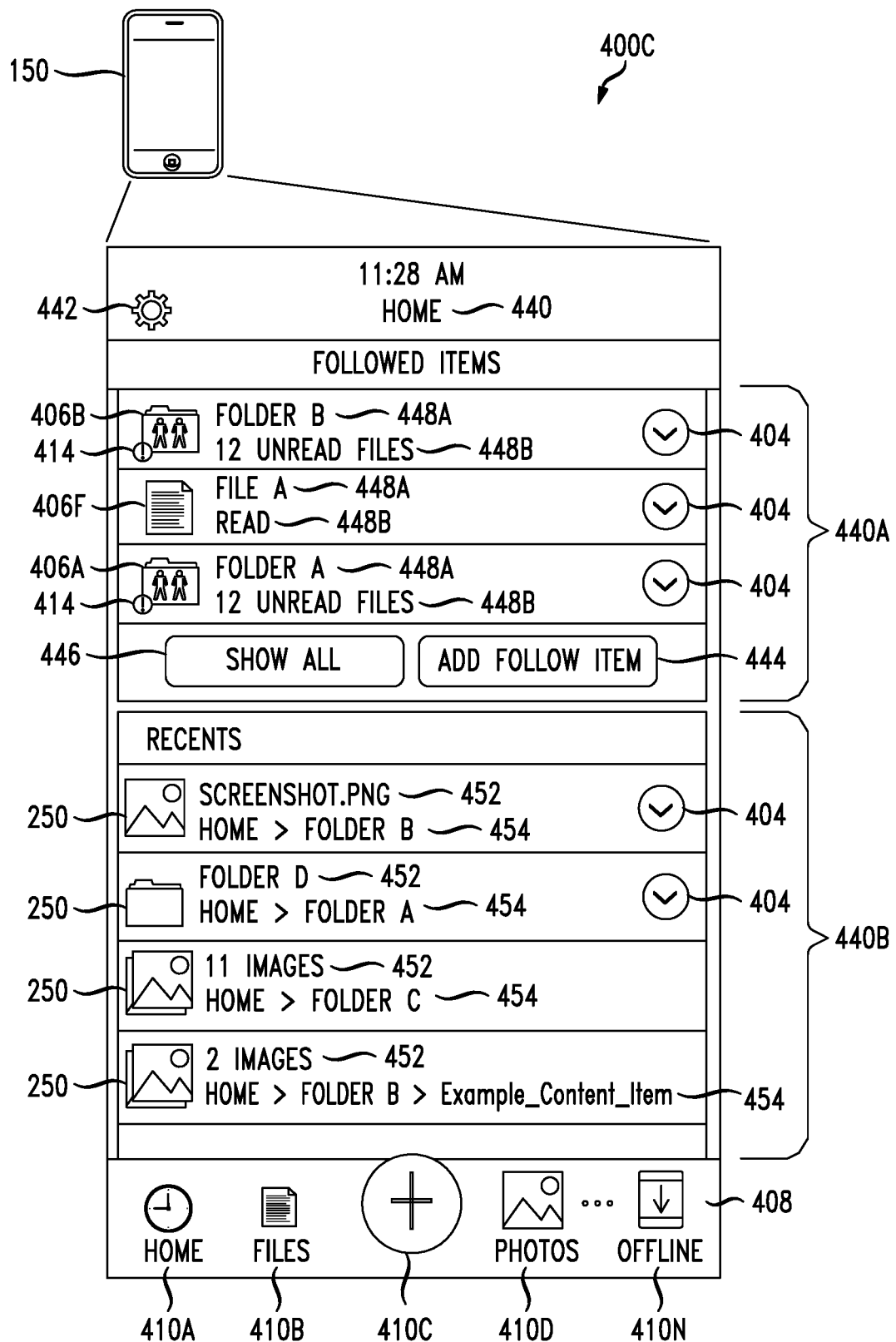

FIG. 4C illustrates view 400C including interface window 440 for displaying followed and modified content items. In this example, interface window 440 includes panel 440A which displays followed items and panel 440B which displays recent items. Followed items panel 440A can present content items 406A, 406B, 406F that have follow setting 426A enabled. Content items 406A, 406B, 406F can be displayed with content identifiers 448A, such as labels or names associated with the content items, and content metadata 448B.

Content metadata 448B can provide information about the contents and/or status of content items 406A, 406B, 406F as well as any sub-items within content items 406A, 406B, 406F. For example, content metadata 448B can indicate a read-unread status of content items 406A, 406B, 406F; a number of sub-items within content items 406A, 406B, 406F; a respective read-unread status of sub-items within content items 406A, 406B, 406F; a number of read and/or unread sub-items within content items 406A, 406B, 406F; dates associated with any modifications to the content or status of content items 406A, 406B, 406F or any sub-items therein; sharing information (e.g., which user accounts have sharing access); etc. In some cases, content metadata 448B can include other information, such as a storage location, ownership information, an indication of the author, security information, etc.

Some or all content items content items 406A, 406B, 406F can be displayed with read-unread status indicators 414. Read-unread status indicators 414 can be visual indicators of an unread status and/or a read status. Read-unread status indicators 414 can include a symbol, a note or label, a thumbnail, an icon, etc. In some cases, read-unread status indicators 414 may be visual indicators of an unread status. Thus, in this example, read-unread status indicators 414 may only be depicted on content items that have an unread status. Those content items that do not have an unread status and instead have a read status may not be depicted with read-unread status indicators 414. Accordingly, the presentation of a read-unread status indicator would indicate to the user that the associated content item has an unread status, and the lack of a read-unread status indicator on a content item would indicate to the user that the associated content item has not been modified since last read event by the user (e.g., since the content item was last seen, opened, modified, accessed, etc., by the user). The unread status represented by a read-unread status indicator can alert the user that the content item includes a modification that has not been read by the user or has an unread status set by the user. The user may manually set the unread status of a content item as a reminder that the user wants to read or revisit the content item at a later time or to ensure the content item is presented according to an unread status.

In the example depicted in FIG. 4C, only content items 406A, 406A having an unread status are depicted with read-unread status indicators 414. Thus, read-unread status indicators 414 are depicted as visual indications of an unread status. Here, the user can quickly identify which content items in followed items panel 440A have an unread status based on read-unread status indicators 414.

In some cases, followed items panel 440A can include other presentation preferences. For example, followed items panel 440A can prioritize the presentation of items based on a read-unread status. To illustrate, content items having an unread status, such as content items 406A-B, can be presented at the top of followed items panel 440A or above content items having a read status, such as content item 406F. As another example, followed items panel 440A can be configured to only load or present content items having an unread status. Content items having a read status may be filtered from view or otherwise loaded upon user request (e.g., upon selection of element 446).

Followed items panel 440A can include selectable options 404 for defining content item preferences as previously described with reference to FIG. 4B. Moreover, followed items panel 440A can include display element 446 for allowing the user to request presentation of additional content items having a follow setting enabled or filtering content items having a follow setting enabled. For example, followed items panel 440A may present X number of content items having a follow setting enabled, but may present display element 446 to allow a user to request presentation of all or additional content items being followed. This can allow view 200C to limit the number of followed items presented initially in followed items panel 440A. The number and/or identity of the followed items initially loaded or presented in followed items panel 440A can depend on one or more factors, such as respective read-unread status information, modification dates, read or unread status dates, respective amount of activity or collaborations, respective content priorities, types or characteristics of content items, and/or other user preferences.

Followed items panel 440A can also display add follow item element 444. Add follow item element 444 can be selectable to allow a user to upload a content item to be followed and/or presented in followed items panel 440A, add a followed item from a different location, load a followed content item within followed items panel 440A that is not currently presented within followed items panel 440A, etc. For example, add follow item element 444 can be used to place within view a followed item that is currently not within view in followed items panel 440A. To illustrate, content item 406A may be a folder which contains File Y. While content item 406A is displayed in followed items panel 440A, File Y may not be displayed in followed items panel 440A. Thus, the user may add File Y to followed items panel 440A using add follow item element 444 to ensure File Y is also presented in followed items panel 440A. File Y can then be presented instead of or in addition to content item 406A. In some cases, File Y would be displayed in addition to content item 406A and may appear as a separate, standalone item.

In some cases, add follow item element 444 may allow a user to select from a list of followed items to request specific followed items to be presented in followed items panel 440A. Moreover, add follow item element 444 can allow a user to add content items that are not currently being followed. In some examples, adding a content item that is not being followed to followed items panel 440A through add follow item element 444 can automatically enable a follow setting for that content item. Thus, by adding the content item through add follow item element 444, the user can not only ensure that the content item is presented in followed items panel 440A, but also that the follow setting of that content item is enabled to continue following that content item.

Panel 440B can display content representations 450 corresponding to recent content items 452. Recent content items 452 can refer to content items that have recently been modified and/or have recently changed status. For example, recent content items 452 can include the last n content items that have been modified, the last n content items that have changed status, and/or the last n content items that have been modified by other users. Recent content items 452 can include content items that are not being followed by the user. However, in some cases, recent content items 452 can be limited to content items being followed by the user.

Content representations 450 can display recent content items 452 individually and/or in groupings. Groupings can be based on one or more factors, such as type of content item, author, modification date, storage location or container (e.g., parent folder), etc. For example, recent content items contained within a same folder and/or sub-folder can be displayed or represented as a group. Moreover, recent content items 452 associated with content representations 450 can be displayed with descriptive information 454, such as a description of a grouping of a corresponding content representation 450, names and/or extension information, metadata etc. Non-limiting examples of descriptive information 454 of a respective content representation and/or one or more recent content items 452 associated with the respective content representation can include a storage location or path, a content hierarchy, a resource locator (e.g., URL or URI), a number of recent content items 452, a description, a status, etc.

In some cases, interface window 440 can be a home or portal page for client application 152. For example, interface window 440 can be the first page loaded when client application 152 is launched at client device 150. In other examples, interface window 440 can be presented within, or accessible from, a home or portal page for client application 152. In yet other examples, interface window 440 can be launched from any interface window in client application 152. For example, client application 152 may include an icon or link to interface window 440, which can allow a user to quickly launch interface window 440 from any location in client application 152 in order to access view 400C.

Moreover, in some configurations, interface window 440 may exclude panel 440B and only display (at least initially) panel 440A. For example, interface window 440 may display followed items panel 440A by default but may only display panel 440B upon request by the user. Interface window 440 can also display settings control element 442 for configuring what content is presented on interface window 440 and how such content is presented.

Content items presented in panel 400A and/or panel 400B can include various levels of sub-items or may be organized according to a hierarchy having multiple levels. Accordingly, users can select content items presented in panel 400A and/or 400B to navigate or drill down to lower levels of content. For example, a user can select content item 406A in panel 400A to view content items within content item 406A, as well as respective status information.

Figure 4D:
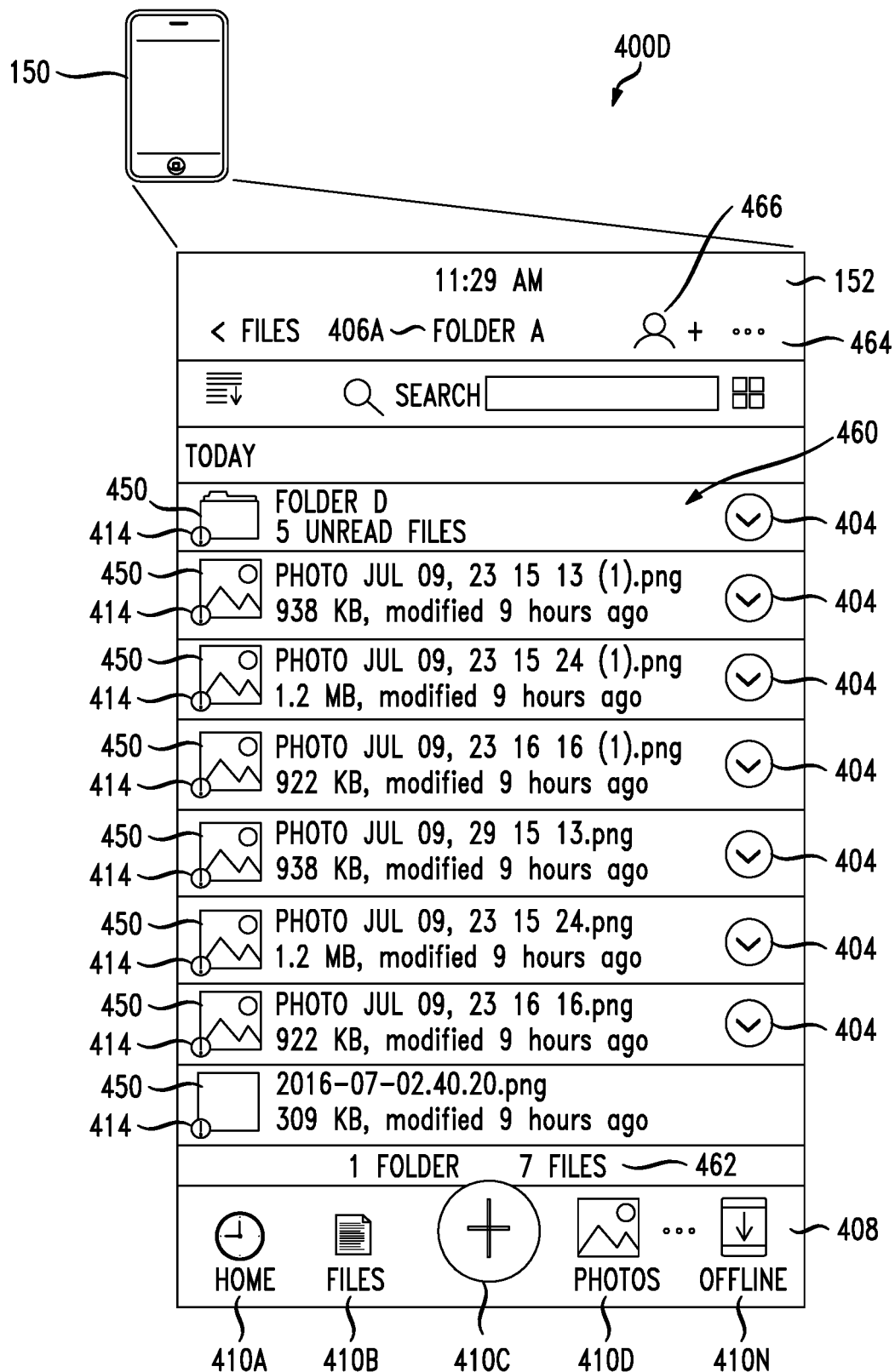

FIG. 4D illustrates view 400D for content item 406A from followed items panel 440A. View 400D illustrates content items 460 located within content item 406A. Content items 460 are displayed via content representations 450. In this example, all content items 460 have an unread status and are therefore presented with read-unread status indicators 414 visually indicating an unread status for each content item. View 400D also includes description 462 of content items 460.

View 400D can also include control elements 464, 466 for modifying settings for content item 406A, such as user preferences, user membership or sharing preferences, etc. Content items 460 can also be presented with selectable options 404 that allow the user to set preferences, such as follow settings, individually for content items 460 in content item 406A.

As events associated with content item 406A and content items 460 are generated, such as user interactions or modifications, the status of one or more content items 460 can change. Content items 460 can be updated to depict their current status. Thus, changes in the status of one or more content items 460 can trigger changes or updates in how such content items are presented.

Figure 4E:
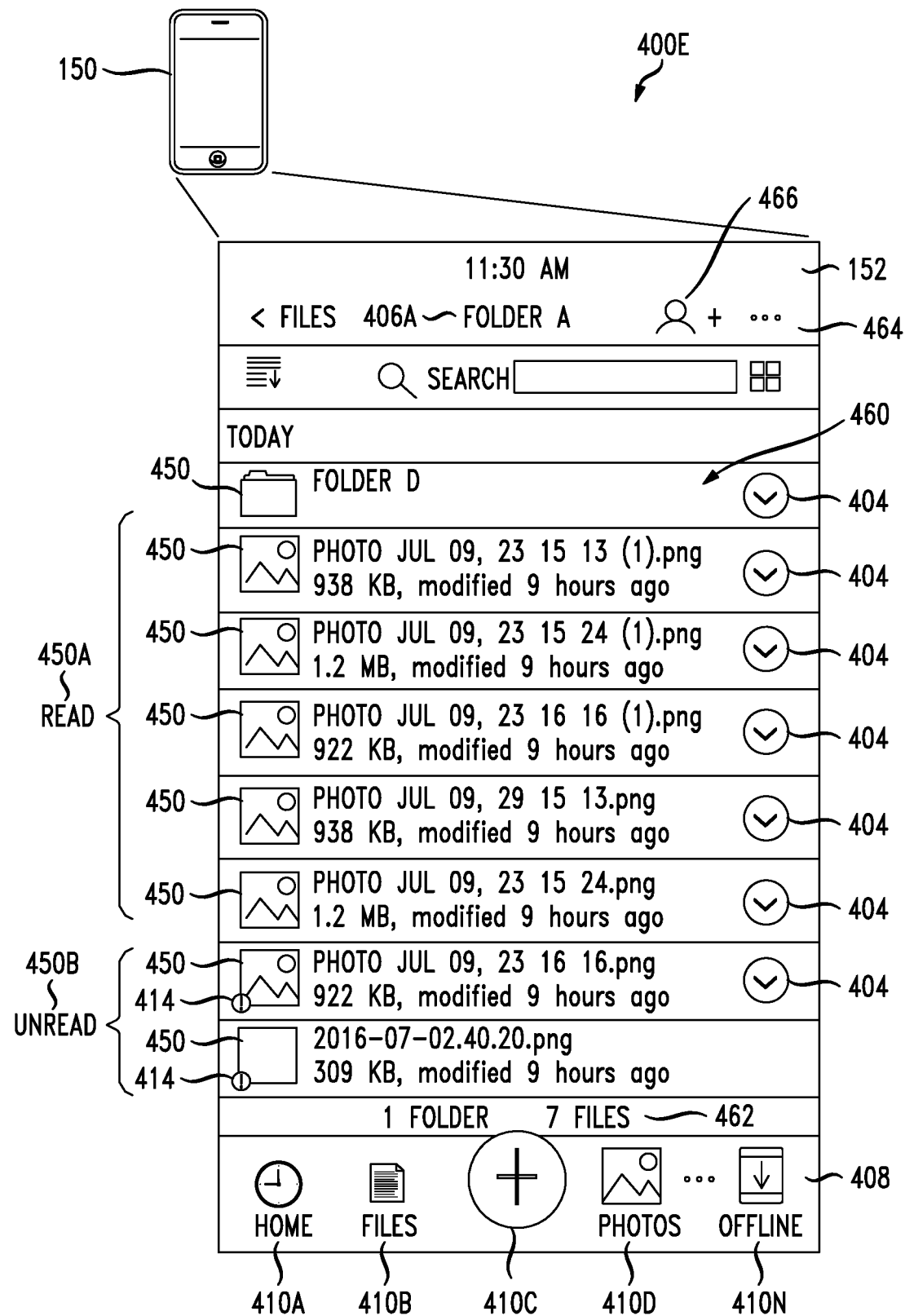

For example, referring to FIG. 4E, view 400E represents an update to view 400D from FIG. 4D, which displays content items 460 according to their current status after one or more status changes. In this example, view 400E includes read items 450A and unread items 450B. Those content representations 450 from unread items 450B are displayed with unread status indicators 414. Unread status indicators 414 indicate that unread items 450B currently have an unread status. On the other hand, those content representations 450 from read items 450A are displayed without unread status indicators 414.

Thus, in view 400E, read items 450A no longer include unread status indicators 414—unlike view 400D which displays unread status indicators 414. The lack of unread status indicators 414 indicates that read items 450A currently have a read status. In these examples, the status of those content items corresponding to read items 450A in view 400E has changed from unread status in view 400D to a current read status in view 400E. The status change in read items 450A can result from a read triggering event, such as a read event by the user, a user read preference setting, an unfollow event, etc.

Unread status indicators 414 in view 400E allow the user to determine which content items in content item 406A have not been read (i.e., unread items 450B) and which content items have been read (i.e., read items 450A), or at least have acquired a read status since view 400D.

Client application 152 can continue updating which content items are depicted as being followed, read, unread, etc., as events take place that set or modify the follow and/or read-unread status of content items. The user can thus maintain an updated view of followed content items and their respective status. The user can quickly identify which content items of interest (e.g., followed content items) have been modified since last seen or accessed by the user.

Figure 4F:
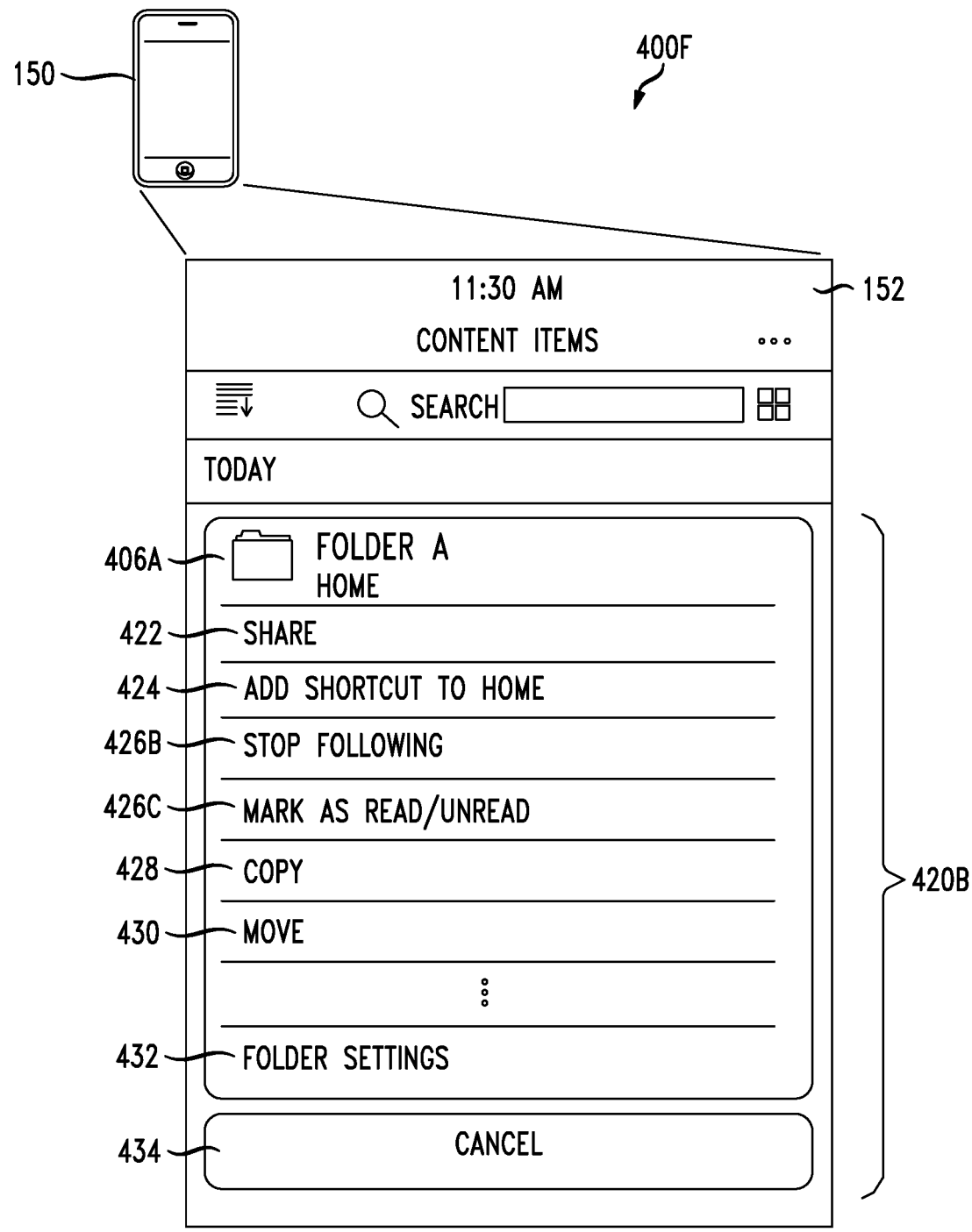

Referring to FIG. 4F, view 400F illustrates an example interface for disabling a follow setting for a content item. In this example, preferences window 420B for content item 406A can be triggered by selecting selectable option 404 of content item 406A as previously explained. Preferences window 420B includes follow setting 426B for disabling a follow setting of content item 406A, which was previously enabled by the user via follow setting 426A of preferences window 420A in view 400B, as described with reference to FIG. 4B. Follow setting 426B thus allows the user to stop following content item 406A. Once follow setting 426B is disabled for content item 406A, content item 406A will not be presented within followed items panel 440A. Moreover, content item 406A will not be monitored for read-unread status changes, or displayed with read-unread status information.

If content item 406A is a folder or container that contains other items, the user can select to disable follow setting 426B for content item 406A only or content item 406A and one or more content items within content item 406A. In some cases, follow setting 426B can be propagated to sub-items or only applied to content item 406A. In other examples, follow setting 426B may be propagated to some sub-items but not others. For example, any sub-items that are being followed by virtue of being contained within content item 406A while content item 406A is being followed, can inherit follow setting 426B from content item 406A. However, sub-items that are being followed based on an explicit input by the user enabling the follow setting for those sub-items, may not inherit follow setting 426B from content item 406A, as explicit preferences may be given priority over inherited preferences.

As illustrated in FIGS. 4A-F, the user can maintain individual control of which items to follow, filtering content items that may not be of interest to the user and focusing on those content items that are deemed interesting or important to the user. The user can enable follow settings of content items as desired by the user, when desired by the user, and similarly disable follow settings for content items as desired by the user when desired by the user. The user can not only control which content items to follow, but also how many content items to follow. This allows the user to increase the user's exposure to updates and collaboration events while reducing the likelihood of information overload.

Figure 5A:
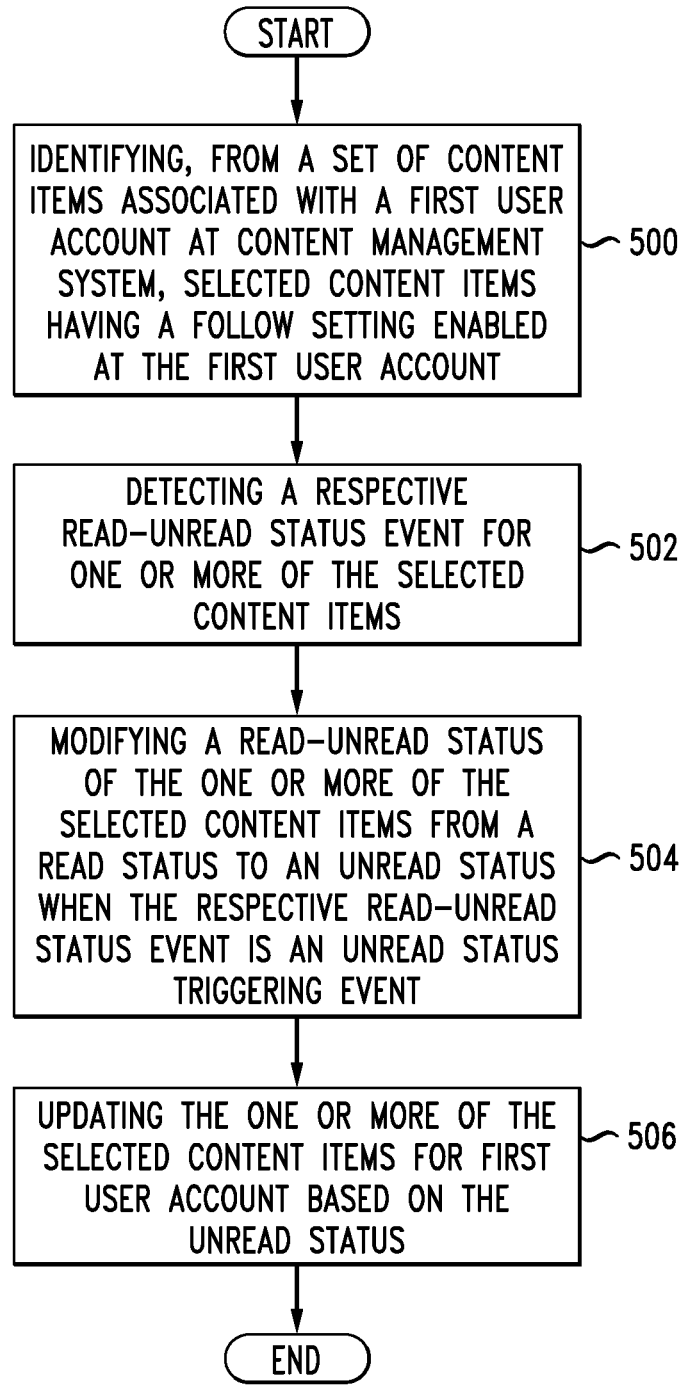
FIGS. 5A and 5B illustrate example methods for following content items in a synchronized collaboration environment.
Figure 6:
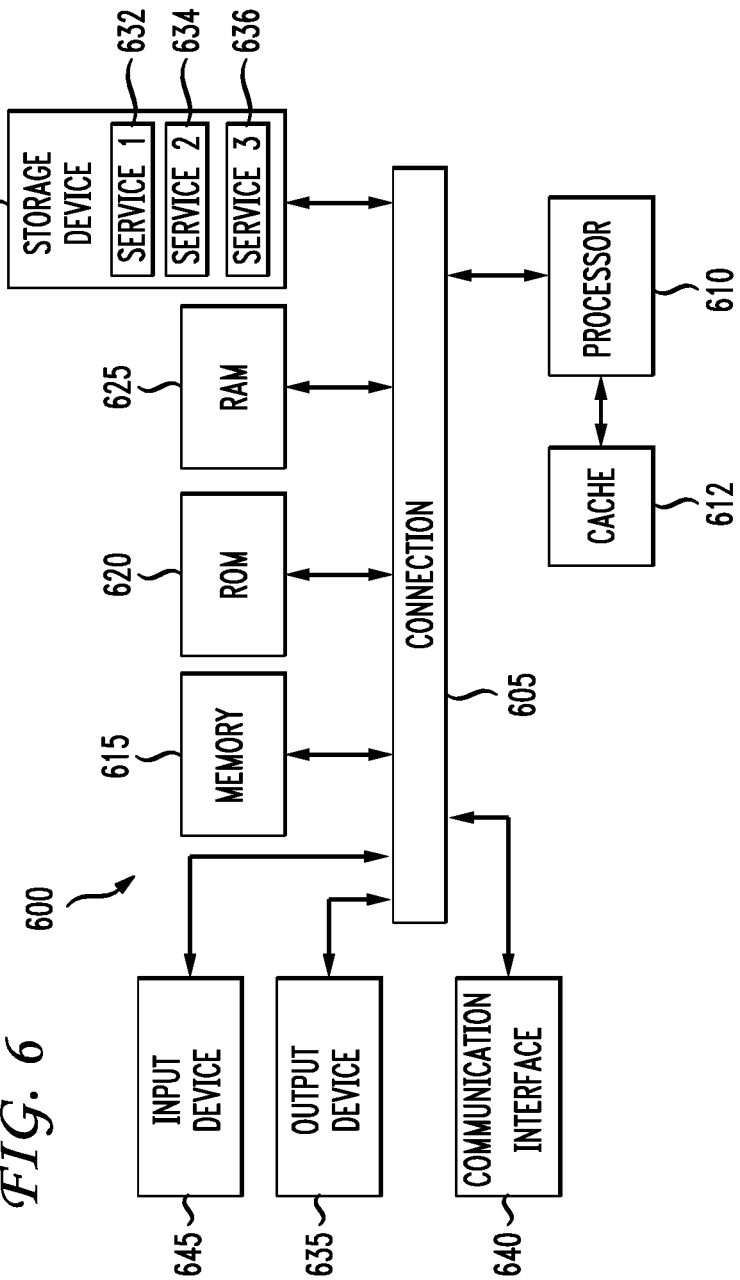
FIG. 6 illustrates an example system embodiment.

FIG. 5A illustrates an example method for following content items. At step 500, the method can involve identifying, from a set of content items associated with a first user account at content management system 110, selected content items having a follow setting enabled at the first user account. The follow setting can include a preference to track a read-unread status of the selected content items and present the selected content items to the first user account according to the the read-unread status. The read-unread status can include a read status or an unread status.

At step 502, the method can involve detecting a respective read-unread status event for one or more of the selected content items. The respective read-unread status event can include a read event or an unread event. A read event for a content item can be an interaction between the first user account and the content item, such as the first user account opening the content item, reading the content item, modifying the content item, setting a read preference for the content item, etc. The unread event for a content item can be a content modification associated with one or more second user accounts at content management system 110 or an input from the first user account defining an unread preference for the content item.

At step 504, the method can include modifying a read-unread status of the one or more of the selected content items from a read status to an unread status when the respective read-unread status event is an unread status triggering event. The unread status triggering event can be an unread event that triggers a change from a read status to an unread status. As previously mentioned, the unread event can be a content modification from one or more second user accounts or an input from the first user account defining an unread preference. The unread event can trigger the change from a read status to unread status if the read-unread status of the content item is set to read when the unread event is generated. If the content item is associated with content items and set to inherit the read-unread status of the associated content items, then the associated content items may need to have a specific read-unread status for the unread event to trigger the change from a read status to unread status or the unread event may have to also modify the read-unread status of the associated content items.

For example, if the content item is a folder which inherits the unread status of sub-items, then the unread event may only trigger the change from a read status to unread status on the content item if the sub-items also have a read status. As another example, if the content item is a sub-item in a folder which propagates its read-unread status to the content item, then the unread event may only trigger the change from a read status to unread status on the content item if the unread event would also trigger the read-unread status of the folder to change from a read status to an unread status.

At step 506, the method can involve updating the one or more of the selected content items for the first user account based on the unread status. Updating the one or more of the selected content items can include presenting the one or more of the selected content items with a visual indication of the unread status. Moreover, updating the one or more of the selected content items can include presenting the one or more of the selected content items in a followed items window or panel, presenting the one or more of the selected content items in a different priority or organization, adjusting a visual presentation of the one or more of the selected content items (e.g., adjusting a color, font, icon, thumbnail, size, etc.), and so forth.

The method can continue to monitor the selected content items and identify any changes in the follow settings of content items associated with the first user account. The method can involve detecting additional read-unread status events for the one or more of the selected content items, and further modifying the read-unread status of the one or more of the selected content items based on detected read-unread status events. For example, the method can involve modifying the read-unread status from unread status back to read status if a detected read-unread status event is a read event. The read event can be based on an interaction between the first user account and the one or more of the selected content items, a user input from the first user account which sets a read preference for the one or more of the selected content items, or a read preference inherited from another content item associated with the one or more of the selected content items.

Figure 5B:
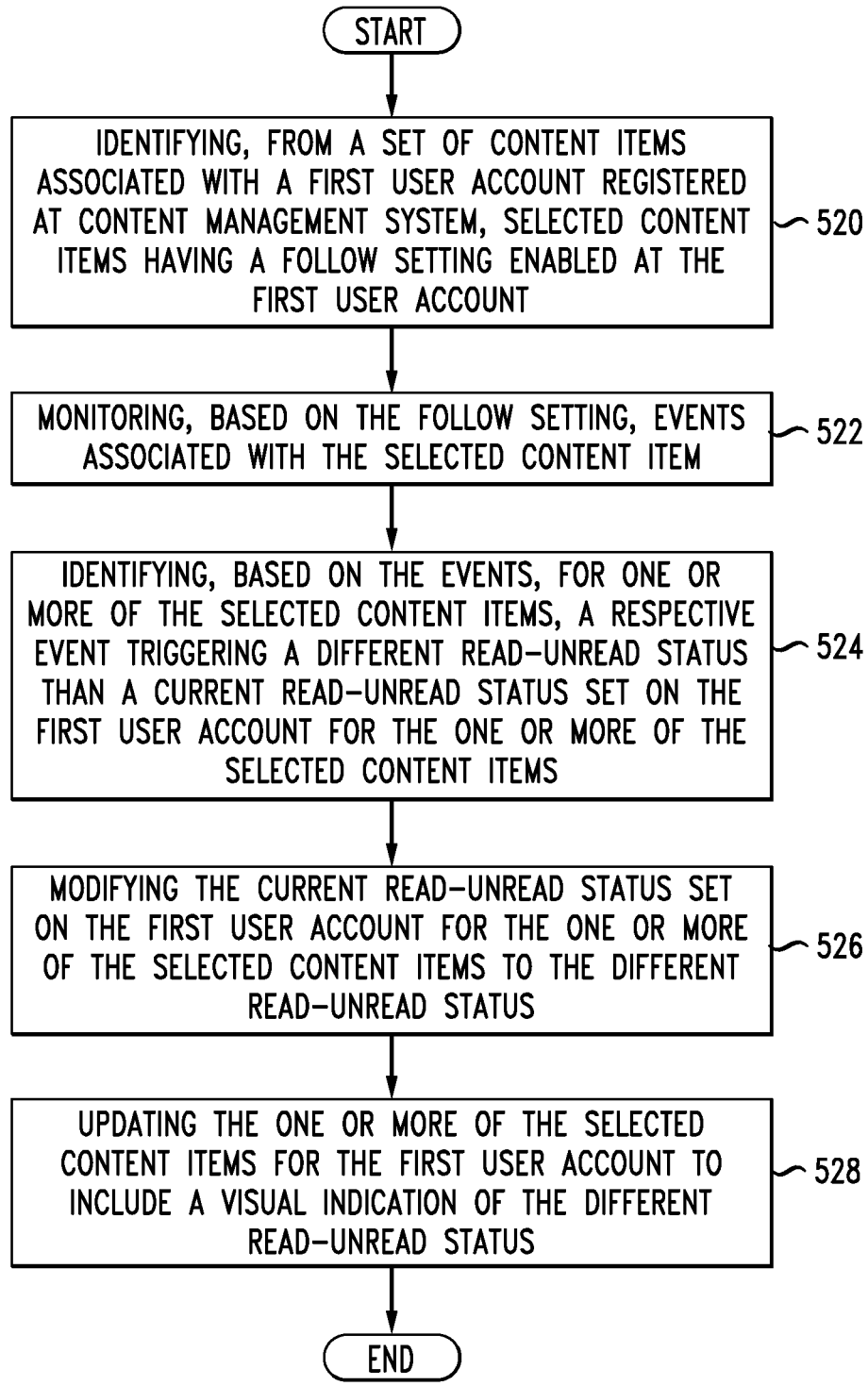

FIG. 5B illustrates another example method for following content items. At step 520, the method can involve identifying, from a set of content items associated with a first user account registered at content management system 110, selected content items having a follow setting enabled at the first user account. The follow setting can include a preference to track respective changes to the selected content items, such as content changes and changes to the read-unread status of the selected content items.

At step 522, the method can involve monitoring, based on the follow setting, events associated with the selected content items. The events can include content modifications from one or more second user accounts at content management system 110 and/or read-unread status events from the first user account. The read-unread status events can include read events, such as a content read operation, and user inputs setting a particular read or unread preference for a respective content item.

At step 524, the method can involve identifying, based on the events, for one or more of the selected content items, a respective event triggering a different read-unread status than a current read-unread status set on the first user account for the one or more of the selected content items. The different read-unread status can be a read status when the current read-unread status is set to unread or an unread status when the current read-unread status is set to read.

At step 526, the method can involve modifying the current read-unread status set on the first user account for the one or more of the selected content items to the different read-unread status. At step 528, the method can involve updating the one or more of the selected content items for the first user account to include a visual indication of the different read-unread status.

In some examples, the different read-unread status can be the unread status, and the respective event can trigger the unread status when the respective event is a content modification from the one or more second user accounts or an input from the first user account setting an unread preference for the one or more of the selected content items. In other examples, the different read-unread status can be the read status, and the respective event can trigger the read status when the respective event is a read event from the first user account or an input from the first user account setting a read preference for the one or more of the selected content items.

FIG. 6 illustrates an example computing system architecture 600 wherein the components of the system are in communication with each other using a connection 605. Connection 605 can be a physical connection via a bus, or direct connection into processor 610 such as in a chipset architecture. Connection 605 can also be a virtual connection, networked connection, or logical connection.

In some embodiments 600 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 600 includes at least one processing unit (CPU or processor) 610 and a connection 605 that couples various system components including the system memory 615, such as read only memory (ROM) and random access memory (RAM) to the processor 610. The system 600 can include a cache of high-speed memory connected directly with, in close proximity to, or integrated as part of the processor 610.

The processor 610 can include any general purpose processor and a hardware service or software service, such as service 1 632, service 2 634, and service 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as the processor 610, bus 605, output device 635, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The description and drawings herein are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or any example term. Likewise, the disclosure is not limited to various embodiments given in this specification.

As used herein, claim language reciting "at least one of" a first item "and" a second item indicates that the first item, the second item, or both the first and second item satisfy the claim. For example, claim language reciting "at least one of A and B" indicates that either a set of A or B (e.g., A only or B only) or a set of A and B (e.g., both A and B) can satisfy the claim.

What is claimed is:

1. A computer-implemented method comprising:
    identifying, from a plurality of content items associated with a first user account registered at a content management system, selected content items having a follow setting enabled at the first user account, the follow setting comprising a preference to track respective changes to the selected content items, wherein the first user account is associated with a client device;
    in response to the follow setting, monitoring, for each of the selected content items, content modification events from one or more second user accounts at the content management system and read-unread status events from the first user account received from the client device;
    identifying, for the selected content items, each content modification event that is controlled by a user-defined read-unread status preference and is triggering a different read-unread status than a corresponding current read-unread status set on the first user account;
    identifying, for the selected content items, each content modification event that is not controlled by a user-defined read-unread status preference and is triggering a different read-unread status than a corresponding current read-unread status set on the first user account;
    modifying the corresponding current read-unread status set on the first user account for the selected content items to the different read-unread status, wherein user-defined read-unread status preferences are given priority over content modification events;
    updating the one or more of the selected content items for the first user account to include a visual indication of the different read-unread status;
    updating the one or more of the selected content items for the first user account to include a content modification from the one or more second user accounts;
    sending, to the client device, synchronization data associated with the content modification from the one or more second user accounts; and
    updating, at the client device, the visual indication of the different read-unread status.

2. The computer-implemented method of claim 1, wherein the different read-unread status comprises an unread status, and wherein each content modification event triggers the unread status when each content modification event comprises one of the content modification from the one or more second user accounts or an input from the first user account setting an unread preference for the one or more of the selected content items.

3. The computer-implemented method of claim 1, wherein the visual indication of the different read-unread status comprises at least one of an alert, a symbol, a label, or an icon, and wherein updating the one or more of the selected content items for the first user account to include a visual indication of the different read-unread status comprises presenting the one or more of the selected content items with the visual indication of the different read-unread status in a separate interface window displaying content items having the follow setting enabled.

4. The computer-implemented method of claim 1, wherein the different read-unread status comprises a read status, and wherein each content modification event triggers the read status when each content modification event comprises a read event from the first user account.

5. The computer-implemented method of claim 1, wherein the one or more of the selected content items comprise a folder containing sub-items, and wherein each content modification event comprises an event from the one or more second user accounts modifying a content of one or more of the sub-items, wherein modifying the current read-unread status comprises:
  modifying a respective read-unread status of the one or more of the sub-items from a read status to an unread status based on the event from the one or more second user accounts; and
    propagating the unread status from the one or more of the sub-items to the folder based on a read-unread status inheritance preference.

6. The computer-implemented method of claim 1, wherein the one or more of the selected content items comprise a folder containing sub-items, wherein the different read-unread status comprises an unread status and each content modification event triggers the unread status for the folder only when a respective read-unread status of all sub-items is set to read.

7. The computer-implemented method of claim 1, wherein identifying, for the one or more of the selected content items, each content modification event triggering the different read-unread status than the current read-unread status comprises:
  detecting each content modification event;
    in response to detecting each content modification event, determining the current read-unread status set on the first user account for the one or more of the selected content items;
  determining a respective read-unread status corresponding to each content modification event;
    comparing the respective read-unread status with the current read-unread status; and
  based on a determination that the respective read-unread status is different than the current read-unread status, determining that the respective read-unread status triggers the different read-unread status.

8. The computer-implemented method of claim 1, wherein the current read-unread status comprises a read status and the different read-unread status comprises an unread status, and wherein modifying the current read-unread status to the different read-unread status comprises modifying the current read-unread status to the unread status and the visual indication to reflect the unread status, the method further comprising:
  detecting a second event associated with the one or more of the selected content items;
  determining that the second event comprises a read event from the first user account; and
  in response to determining that the second event comprises the read event:
  modifying the current read-unread status from the unread status to the read status; and
  removing the visual indication for the one or more of the selected content items.

9. A non-transitory computer-readable medium comprising:
  instructions stored therein which, when executed by one or more processors, cause the one or more processors to:
  provide, to a first user account at a content management system, access to a plurality of content items associated with the first user account;
  identify, from the plurality of content items associated with a first user account at a content management system, selected content items having a follow setting enabled at the first user account, the follow setting comprising a preference to track a respective read-unread status of the selected content items, wherein the first user account is associated with a client device;
  detect a respective read-unread status event for one or more of the selected content items having the follow setting enabled;
  identify, for one or more the selected content items, each read-unread status event that is controlled by a user-defined read-unread status preference;
  modify, for each read-unread status event that is controlled by a user-defined read-unread status preference, the respective read-unread status when the respective read-unread status event is configured to trigger a different read-unread status than a corresponding current read-unread status set on the first user account in accordance with the respective user-defined read-unread status preference;
  modify the respective read-unread status of the one or more of the selected content items from a read status to an unread status when the respective read-unread status event is a content modification associated with one or more second user accounts at the content management system, wherein user-defined read-unread status preferences are given priority over the content modifications;
  update the one or more of the selected content items for the first user account to include the content modification associated with the one or more second user accounts;
  sending, to the client device, synchronization data associated with the content modification associated with the one or more second user accounts; and
  based on the modifying of the respective read-unread status, present the one or more of the selected content items to the first user account with a visual indication of the unread status.

10. The non-transitory computer readable medium of claim 9, storing additional instructions which, when executed by the one or more processors, cause the one or more processors to:
  modify the unread status of the one or more of the selected content items to the read status in response to detecting a read event from the first user account.

11. The non-transitory computer readable medium of claim 9, wherein the visual indication of the unread status comprises at least one of an alert, a symbol, a label, or an icon, and wherein the one or more of the selected content items are presented with the visual indication in a separate interface window displaying selected content items having the follow setting enabled.

12. The non-transitory computer readable medium of claim 9, storing additional instructions which, when executed by the one or more processors, cause the one or more processors to:
  prior to modifying the respective read-unread status, determine that the respective read-unread status is set to the read status.

13. The non-transitory computer readable medium of claim 12, storing additional instructions which, when executed by the one or more processors, cause the one or more processors to:
  detect a second respective read-unread status event for one or more of the selected content items;

determine that the second respective read-unread status event comprises an unread event for the one or more of the selected content items;
determine that the respective read-unread status is already set to the unread status; and
in response to determining that the respective read-unread status is already set to the unread status, update a content of the one or more of the selected content items based on the unread event without adjusting the respective read-unread status of the one or more of the selected content items.

14. The non-transitory computer readable medium of claim 9, wherein the one or more of the selected content items is a folder containing sub-items, wherein the content modification is associated with one or more of the sub-items, and wherein modifying the respective read-unread status of the one or more of the selected content items comprises:
modifying the respective read-unread status of the one or more of the sub-items from the read status to the unread status based on the content modification;
propagating the unread status from the one or more of the sub-items to the folder based on a read-unread status inheritance preference; and
modifying the respective read-unread status of the folder based on the unread status propagated from the one or more of the sub-items in the folder.

15. An apparatus comprising:
one or more processors; and
at least one computer-readable storage medium having stored therein instructions which, when executed by the one or more processors, cause the one or more processors to:
identify, from a plurality of content items associated with a first user account registered at a content management system, selected content items having a follow setting enabled at the first user account, the follow setting comprising a preference to track respective changes to the selected content items, wherein the first user account is associated with a client device;
based on the follow setting, monitor events associated with the selected content items, the events comprising content modifications from one or more second user accounts at the content management system and read-unread status events from the first user account;
based on the events, identify, for one or more of the selected content items, each event that is controlled by a user-defined read-unread status preference and is triggering a different read-unread status than a corresponding current read-unread status set on the first user account;
based on the events, identify, for one or more of the selected content items, each event that is not controlled by a user-defined read-unread status preference and is triggering a different read-unread status than a corresponding current read-unread status set on the first user account for the one or more of the selected content items;
modify the current read-unread status set on the first user account for the one or more of the selected content items to the different read-unread status, wherein user-defined read-unread status preferences are given priority over the events that are not controlled by a user-defined read-unread status preference;
update the one or more of the selected content items for the first user account to include a visual indication of the different read-unread status;
update the one or more of the selected content items for the first user account to include a content modification from the one or more second user accounts;
send, to the client device, synchronization data associated with the content modification from the one or more second user accounts; and
update, at the client device, the visual indication of the different read-unread status.

16. The apparatus of claim 15, wherein the different read-unread status comprises an unread status, and wherein each event triggers the unread status when each event comprises one of the content modification from the one or more second user accounts or an input from the first user account setting an unread preference for the one or more of the selected content items.

17. The apparatus of claim 15, wherein the different read-unread status comprises a read status, and wherein each event triggers the read status when each event comprises a read event from the first user account.

18. The apparatus of claim 15, wherein identifying, for the one or more of the selected content items, each event triggering the different read-unread status than the current read-unread status comprises:
detecting each event;
in response to detecting each event, determining the current read-unread status set on the first user account for the one or more of the selected content items;
determining a respective read-unread status corresponding to each event;
comparing the respective read-unread status with the current read-unread status; and
based on a determination that the respective read-unread status is different than the current read-unread status, determining that the respective read-unread status triggers the different read-unread status.

19. The apparatus of claim 15, wherein the current read-unread status comprises a read status and the different read-unread status comprises an unread status, and wherein modifying the current read-unread status to the different read-unread status comprises modifying the current read-unread status to the unread status and the visual indication to reflect the unread status.

20. The apparatus of claim 19, the at least one computer-readable storage medium storing additional instructions which, when executed by the one or more processors, cause the one or more processors to:
detect a second event associated with the one or more of the selected content items;
determine that the second event comprises a read event from the first user account; and
in response to determining that the second event comprises the read event:
modify the current read-unread status from the unread status to the read status; and
remove the visual indication for the one or more of the selected content items.

* * * * *